July 1, 1969  W. M. GOODHUE ET AL  3,452,609
GYROSCOPE PICKOFF-TORQUER SYSTEM
Filed April 14, 1966

INVENTORS:
WILLIAM M. GOODHUE
SIDNEY OSBAND
HERMAN SABATH
BY Howson & Howson
ATTYS.

July 1, 1969  W. M. GOODHUE ET AL  3,452,609
GYROSCOPE PICKOFF-TORQUER SYSTEM
Filed April 14, 1966  Sheet 2 of 3

INVENTORS:
WILLIAM M. GOODHUE
SIDNEY OSBAND
HERMAN SABATH
BY Howson & Howson
ATTYS.

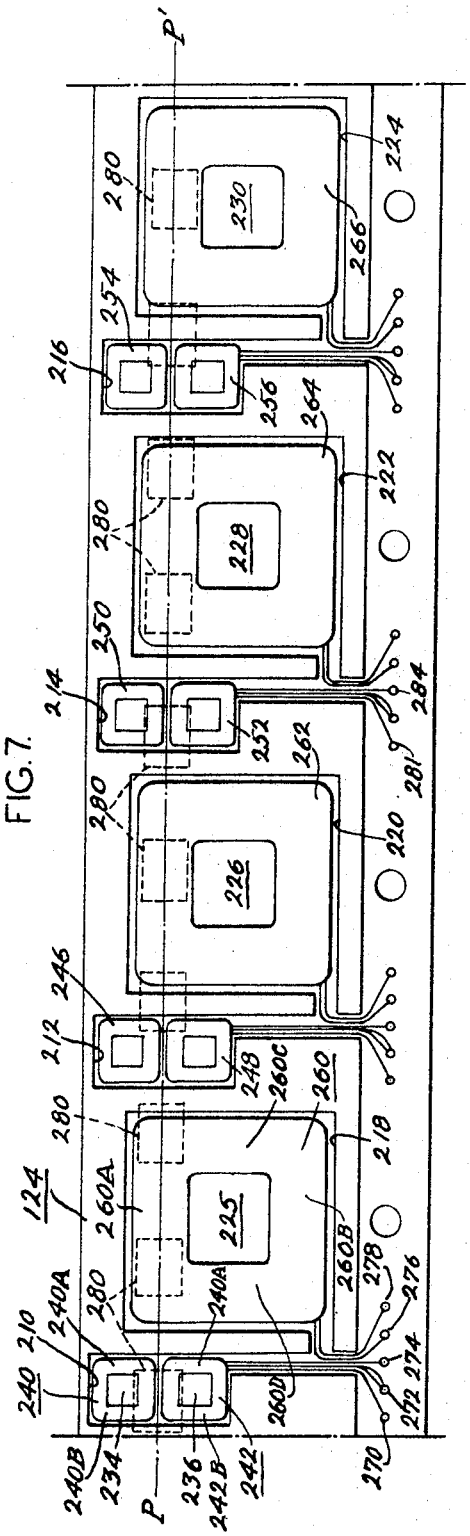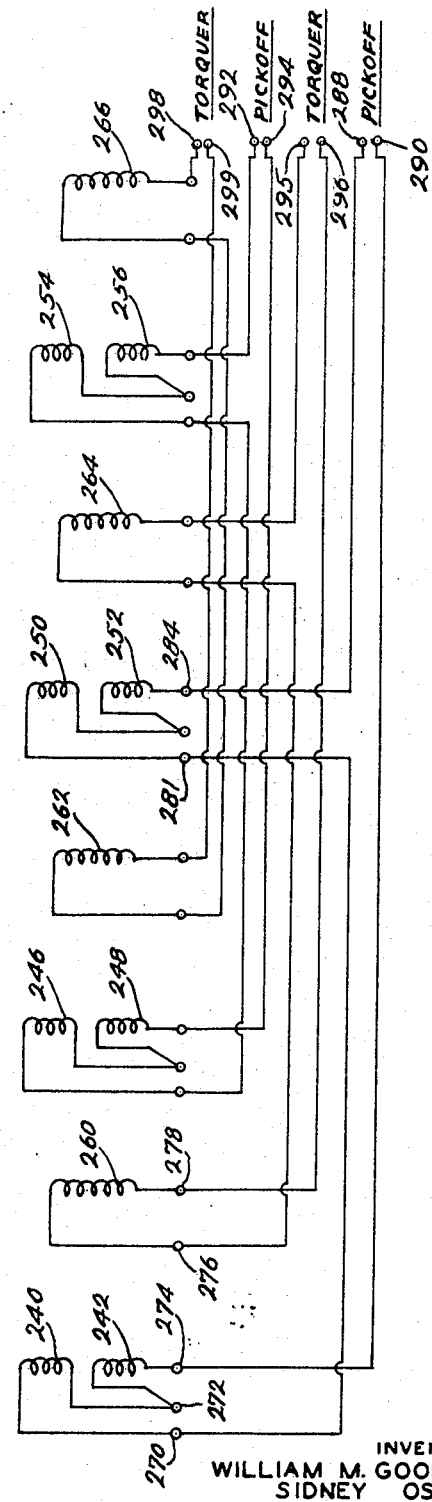

United States Patent Office 3,452,609
Patented July 1, 1969

3,452,609
GYROSCOPE PICKOFF-TORQUER SYSTEM
William M. Goodhue, Freeport, Sidney Osband, Plainview, and Herman Sabath, Old Bethpage, N.Y., assignors to AMBAC Industries, Incorporated, Garden City, N.Y., a corporation of New York
Filed Apr. 14, 1966, Ser. No. 542,645
Int. Cl. G01c 19/28
U.S. Cl. 74—5.6                   20 Claims The present invention relates to pickoff and torquer systems for gyroscopes.

The usual gyroscope comprises a rotating wheel or inertia mass which tends to maintain its spin axis fixed in space, but which is responsive to torques applied about axes normal to the spin axis to change the angular position of the spin axis and hence the angular position of the plane of rotation of the wheel. Typically the rotating wheel is mounted on a supporting frame by a support system which minimizes mechanical coupling between the supporting frame and the rotating wheel.

In many applications it is desirable to derive accurate indications of the angular position of the plane of rotation of the gyro wheel with respect to the supporting frame, and a variety of types of pickoff devices are known and have been employed for this purpose. It is also desirable in many applications to apply controlling torques to the rotating wheel about axes normal to the spin axis, for example to servo the wheel to follow changes in angular position of the frame, and a variety of so-called torquer devices are known and have been used for this purpose.

One common type of pickoff and torquer makes use of magnetic interaction between the rotating wheel and electrical coil means mounted on the supporting frame. For example, the wheel may have an annular magnetic portion which rotates past pickoff and torquer coils fixed to the frame; angular changes in the plane of rotation of the wheel then produce detectable changes in the current in the pickoff coils, and currents applied to the torquer coils produce desired control torques on the rotating wheel.

While such arrangements have been found quite satisfactory in many applications for producing pickoff signals and for providing torquing of the gyro wheel, they have the inherent drawback that the resultant magnetic coupling between the wheel and the supporting frame, including the usual housing which is part of the frame and encloses the gyro wheel, causes undesired torques to be exerted upon the rotating wheel. Such undesired torques tend to introduce instability, unreliability and inaccuracy into the gyro operation.

In many types of free-rotor gyros heretofore known, such torques due to undesired stray magnetic coupling have not been serious problems because the magnitudes of the torques were small compared with residual undesired mechanical coupling between the gyro wheel and the supporting frame caused by inadequacies in the support system for the gyro wheel. However, in certain types of free-rotor gyroscopes now known, mechanical coupling of the latter type has been reduced to such an extent that the undesired magnetic coupling produced between the rotating wheel and the supporting frame by conventional electromagnetic pickoffs and torquers has has become a serious limiting factor in the stability, accuracy and reliability of such gyros.

While not limited in its applications to such forms of gyro, the invention is particularly applicable, for example, to free-rotor gyroscopes of the type described and claimed in copending U.S. patent application Ser. No. 291,546 of Edwin W. Howe, filed June 29, 1963, now U.S. Patent No. 3,301,073, and assigned to the assignee of the present application. In the latter type of gyro, mechanical coupling can be caused to approach zero by operation of the gyro at a particular rotational speed, and the principal cause of undesired error-producing torques has been found to be the above-mentioned magnetic coupling between the rotating wheel and the supporting frame which arises when conventional rim-type electromagnetic pickoffs and torquers are utilized.

In the interest of reducing cost and space requirements it is also often important to make the gyroscope as compact as possible.

Accordingly it is an object of the invention to provide a new and useful gyro pickoff and torquer system.

Another object is to provide a new and useful gyro pickoff system in which undesired effects of stray magnetic coupling between the gyro wheel and components external thereto are minimized.

A further object is to provide a new and useful gyro torquer system in which undesired torques on the gyro rotor due to magnetic coupling between the gyro wheel and elements external thereto are minimized.

It is also an object to provide a gyroscope system including pickoff and/or torquer coils, in which undesired magnetic couplings between the gyro wheel and the supporting frame therefor are reduced, while retaining compactness of the gyroscope.

Another object is to provide a new and useful gyroscope system having pickoff means which do not require external electrical excitation.

In accordance with the invention these and other objects are achieved by the provision of a gyro system in which the gyro wheel is provided with an annular circumferential cavity therein extending around the interior of the wheel. Magnet means attached to the wheel provide a homopolar magnetic field across an annular interior air gap in the cavity, i.e. the magnetic flux thereby produced across the annular air gap in the cavity is directed radially of the wheel and in a single sense with respect to the spin axis of the wheel. Coil means are mounted in the annular air gap containing the homopolar magnetic field and are supported from the frame so that, when the wheel and the magnet means attached thereto are rotated, the direction of the magnetic flux lines cutting the coil means and the direction of cutting are the same for all rotational positions of the wheel. The coil means are constructed and arranged to provide either pickoff or torquing functions, or both, and the wheel comprises magnetic material which substantially completely encompasses the annular air gap.

Because the homomagnetic field is produced within, and confined substantially to, the wheel and its interior, magnetic coupling to the supporting frame including the housing is minimized, particularly in the preferred embodiment in which the housing is symmetrical with respect to the spin axis when the wheel is in its reference or null position. This coupling is preferably further reduced by forming the cavity in the wheel so that its opening to the exterior lies along one side face of the wheel only and is only large enough in a direction radial of the wheel to admit non-magnetic, preferably insulating supports for the coil means and to accommodate the degree of annular deviation through which the plane of rotation of the wheel is to move during use. Further reduction in magnetic coupling between the wheel and the exterior is preferably provided by making the opening of the wheel cavity to the exterior relatively long in the direction of the axis of spin of the wheel. To reduce the effects of stray magnetic fields generated externally of the gyro wheel, the wheel is preferably also encased in a chamber providing magnetic shielding, part of which chamber constitutes the above-mentioned housing.

When the coil means are to serve as pickoffs, the homopolar magnetic field is preferably made space-variant along the length of the annular slot according to a predetermined pattern and the coil means comprise at least one pickoff coil mounted in the homopolar field region so that as the wheel and magnet means rotate a varying voltage is induced in each such pickoff coil. Each coil is positioned so that the voltage induced therein has a magnitude which is a function of the deviation of the spin axis from its reference position. In a preferred form of the invention the space-variant homopolar magnetic field is provided by using an annular permanent magnet and magnetic circuit having effective pairs of projecting pole pieces regularly-spaced from each other around the circumference and extending radially toward the coils from either side thereby providing a space-variant reluctance in the magnetic circuit whereby the homopolar magnetic field strength is locally more intense in the air gap directly between opposed poles of each pair. The pickoff coil means then preferably comprise at least a first pair of adjacent coils in the air gap, displaced from each other along the spin axis and positioned so that the magnetic poles, when rotating, pass over a portion of both coils of the pair, the differences in the magnitudes of the voltages thereby induced in the two coils then being dependent upon the lateral position of the poles with respect to the coils and hence upon the angle of the plane of rotation of the wheel. Preferably a second pair of coils is disposed diametrically-opposite the first pair with respect to the nominal spin axis, and the pairs of poles of the magnetic circuit are diametrically-opposite each other across the diameter of the wheel, so that by algebraically subtracting the difference in induced voltage produced by the first coil pair from the difference in induced voltage produced by the second coil pair a resultant angle-indicating pickoff voltage is produced which is insensitive to possible axial translational motions of the wheel with respect to the supporting frame. The above-mentioned first and second pairs of coils therefore produce accurate information as to the direction and magnitude of components of angular deviaiton of the gyro spin axis about a first axis normal to the spin axis; to derive indications of the components of angular deviation of the spin axis about the other orthogonal axis, third and fourth pairs of pickoff coils are preferably employed, the latter two pairs of coils preferably being similar to the first and second coil pairs described above, and similarly positioned axially and radially of the wheel but displaced circumferentially around the nominal spin axis from the first and second coil pairs by 90°.

When the coil means are to provide torquing action, in accordance with a preferred form of the invention the coil means then comprise at least one coil mounted so that one of its sides lies within the homopolar field region in the annular air gap and the opposite side is sufficiently remote that it is cut by little or none of the rotating homopolar magnetic flux. When an electric current is passed through the torquer coil, the magnetic field produced by this current reacts with the magnetic field of the rotating magnetic circuit to apply to the gyro wheel a torque about an axis normal to the spin axis which has a magnitude and sense dependent on the magnitude and sense of the current through the coil. A diametrically-opposed similar torquer coil is preferably also used in cooperation with the first-mentioned torquer coil, not only to double the applied torque but also to effect cancellation of undesirable translational forces which one torquer alone might tend to apply to the gyro wheel. To provide torquing about the other orthogonal axis, a similar pair of torquer coils may be used, spaced at 90° around the nominal spin axis from the first-described pair of torquer coils. The arrangement of each of the torquer coils with respect to the rotating magnet poles is preferably such, as described in detail hereinafter, that the currents which the rotating poles tend to induce in different portions of each torquer coil cancel each other out in that coil and hence do not affect the magnitude of the torquer coil currents. Accordingly, the torque produced by a given applied torquer coil current is substantially constant despite deviations in the angular position of the spin axis of the wheel.

In one principal preferred embodiment of the invention the coil means comprise both pickoff coils and torquer coils of the type and in the arrangement described above, the torquer coils alternating with pairs of pickoff coils along the circumferential length of the slot in the wheel.

These and other objects and features of the invention will be more fully comprehended from a consideration of the following detailed description, taken in connection with the accompanying drawings, in which:

FIGURE 7 is a development of the coil support and the coils thereon in a form preferred for use in the apparatus of FIGURE 2;

FIGURE 8 is an electrical schematic diagram illustrating the preferred connection of coils shown in FIGURE 7.

Figure 1:
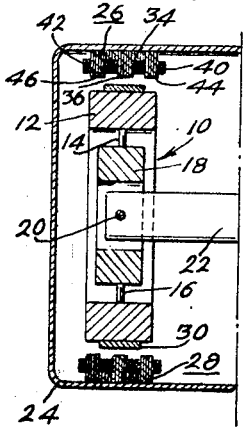
FIGURE 1 is a fragmentary sectional view illustrating the nature of certain prior-art pickoff and torquing arrangements.

Referring now to FIGURE 1, there is illustrated a free-rotor gyro 10 which may be of the type described and claimed in the above-cited copending application Serial No. 291,546 and comprises a gyro wheel 12 mounted by means of a pair of diametrically-opposed, torsionally-flexible pivots 14 and 16 on an inner gimbal ring 18, the inner gimbal ring in turn being mounted by means of a pair of diametrically-opposed, torsionally-flexible pivots 20 on a supporting and driving shaft 22 and extending at right angles to pivots 14 and 16. It will be understood that the supporting and driving shaft 22 is mounted by means of suitable bearings on a support frame of which the housing 24 is a part. The plane of rotation of the wheel 12 with respect to the housing 24 is detected by a pair of E-type pickoffs 26 and 28 in cooperation with a ring 30 of magnetic material on the outer surface of wheel 12. For example, the coil 34 surrounding the center leg 36 of pickoff 26 is usually energized by an alternating voltage and the magnitude of the voltages thereby induced in the coils 40 and 42 surrounding the outer legs 44 and 46 of pickoff 26 vary in mutually opposite senses in response to the displacement of the magnetic ring 30 angularly from its so-called "null position" for which the voltages induced in the two outer coils are equal. It will be appreciated that in any such arrangement which includes a magnetic circuit between a stationary member such as the pickoffs 26 and 28 and a portion of the gyro wheel 12 such as magnetic ring 30, a magnetic coupling is produced between the gyro wheel and the supporting frame which produces undesirable torques when the gyro wheel is angularly displaced from its null position. In an analogous fashion, the common prior-art torquing arrangements using an element on the gyro wheel and an element attached to the support frame to complete a magnetic circuit may result in the application of undesirable torques on the gyro wheel, i.e. torques other than those intended to be produced by control currents applied to the torquer coils.

The apparatus of the present invention has been found particularly effective in reducing such undesired magnetic coupling between the wheel of a free rotor gyro and its support frame including the housing, so as to eliminate or minimize resultant undesirable torques on the gyro wheel. When device of the invention provides a magnetic circuit by which magnetic flux is confined substantially entirely to the rotating structure and its interior, and utilizes non-magnetic pickoff and/or torquer coils disposed inside the gyro wheel and supported on a non-magnetic coil support structure. In addition, in the embodiment of the invention now to be described in detail, the gyro wheel is surrounded by a magnetic shield to prevent externally-generated magnetic fields from acting on the gyro wheel to produce undesired torques.

Figure 3:
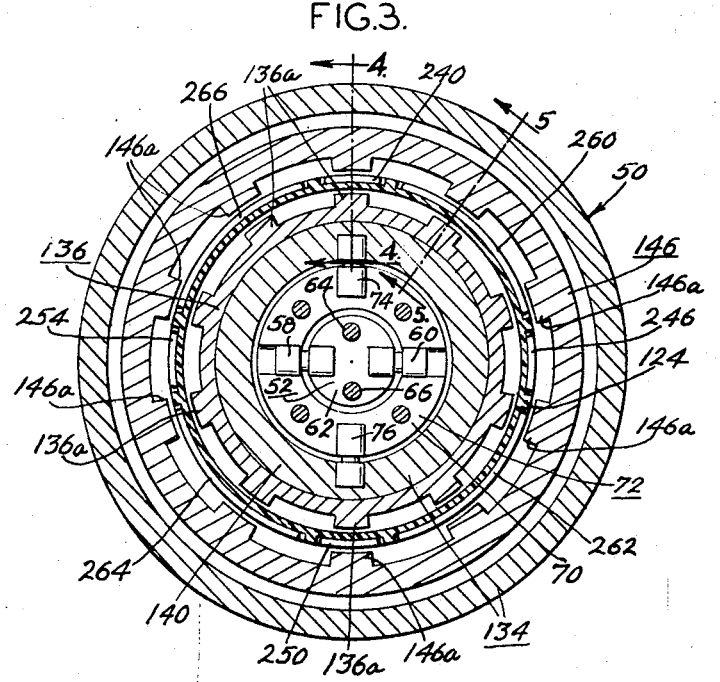
FIGURE 3 is a sectional view taken along line 3—3 of FIGURE 2.
Figure 2:
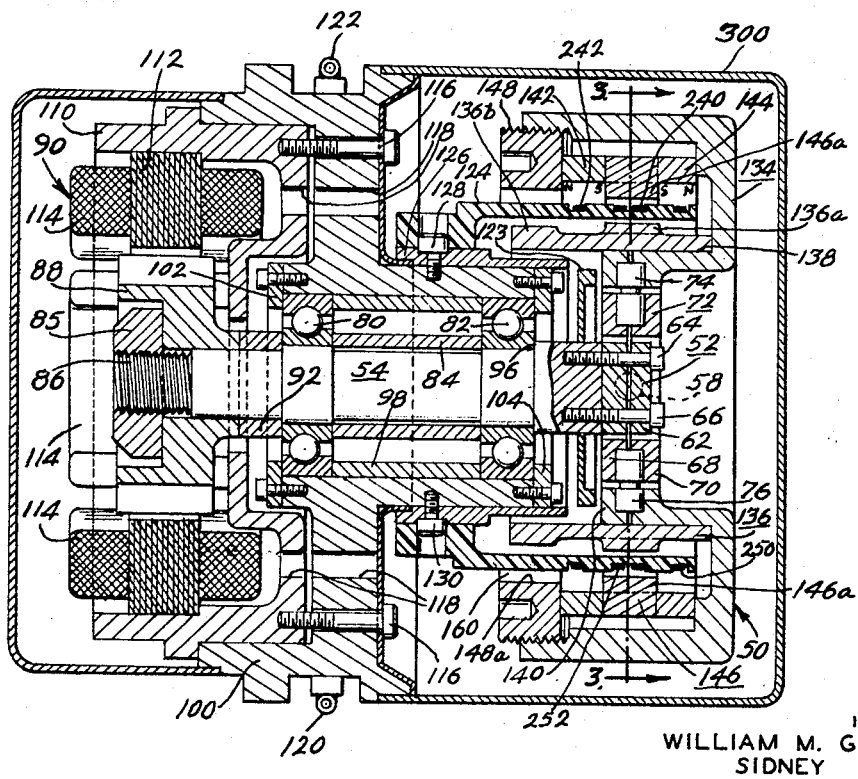
FIGURE 2 is a longitudinal sectional view of a gyroscope incorporating the invention in one of its preferred forms.

Referring now particularly to the embodiment of the invention shown in FIGURES 2 and 3 of the drawings, a composite gyroscope rotor or wheel 50 is supported by a universal joint 52 on one end of shaft 54 in the manner described in the above-cited copending application Ser. No. 291,546. More specifically, the inner ends of spring pivots 58 and 60 are clamped to opposite sides of shaft 54 by means of clamping member 62 and screws 64 and 66. The opposite, radially-outer ends of pivots 58 and 60 are clamped between two rings 68 and 70 which together constitute the inner gimbal ring 72. Also clamped between rings 68 and 70 are the inner ends of a separate pair of spring pivots 74 and 76, diametrically opposite each other and circumferentially at 90° with respect to the pivots 58 and 60. The combined effect of the two pairs of pivots is to permit the gyro wheel 50 to deviate angularly in any direction, within limits, from a reference or null position in which its plane of rotation is normal to the axis of shaft 54. As explained in the above-cited copending application Ser. No. 291,546, the shaft 54 and the wheel 50 are preferably rotated at a particular speed for which mechanical coupling between the shaft and the wheel are reduced substantially to zero. It should be understood that the pickoff and torquer system of the invention has wide application to a large variety of gyros, and the selection of the particular type of gyro suspension shown and described herein for purposes of explaining the invention in no way limits the scope of the invention.

Shaft 54 is journalled in the two ball bearings 80 and 82, the inner races of which are separated by a spacer 84. These inner races are effectively clamped to shaft 54 by the action of the nut 85 which is screw tightly onto the threaded end 86 of the shaft 54 and thereby forces the rotor member 88 of the motor means 90 against a collar 92 which in turn is forced against the inner race of bearing 80. The inner race of bearing 82 is thereby forced against the shoulder 96 on shaft 54. The outer races of bearings 80 and 82 are separated by a spacer 98 and are clamped to the main frame 100 by clamping rings 102 and 104 and suitable screws.

The motor stator 110 which carries the motor core 112 and the stator windings 114 is attached to the frame 100 by means of machine screws 116. Holes 118 in the frame 100 and stator 110, together with other appropriate radial holes (not shown) through frame 100 provide access between the interior of the gyro assembly and the external terminals 120 and 122 for the electrical wiring connections. A limit ring 123 is mounted on shaft 54 against one side of the wheel 50 to limit the angular deviation of the wheel from its reference position and thereby protect the assembly from the effects of possible excessive wheel deviations.

A supporting cylinder 124 for the pickoff and torquer coils to be described hereinafter is made of a non-magnetic material such as a phenolic impregnated cloth, for example, and is cemented to a shield cylinder 126 of a magnetic material such as steel, which is secured to the frame 100 by the screws 128 and 130.

The gyro wheel 50 is a composite assembly which includes a hollow, annular shield member 134 of a magnetic material of high permeability such as silicon steel forming an annular interior cavity coaxial with the spin axis; a substantially cylindrical member 136 of magnetic material mounted on a shelf 138 on shield member 134 and having a regularly-stepped or toothed exterior surface; a clamping ring 140 of a magnetic material for clamping the pivots 74 and 76 to the hub portion 139 of shield member 134; a pair of ring magnets 142 and 144 concentric with the spin axis; an outer annular pole piece 146 located between and abutting said ring magnets 142 and 144 and having a regularly-stepped or toothed inner circumferential surface; and an externally-threaded locking nut 148 of magnetic material which engages internal threads 150 of shield member 134 and when tightened serves to clamp the ring magnets 142 and 144 and the pole piece 146 to shield member 134. The entire gyro wheel is concentric with, and balanced about, the gyro spin axis.

The ring magnets 142 and 144 are magnetized axially, i.e. one flat face of each ring magnet is a north pole while the opposite flat face is a south pole, and they are placed into engagement with the pole piece 146 in such manner that like poles of the ring magnets bear against opposite surfaces of the pole piece 146. The ring magnets may be identical in physical form and composition.

The cylindrical member 136 is regularly stepped on its outer surface in the same manner as the inner surface of pole piece 136, so that the outer face of each of the protruding steps such as 136a on cylindrical member 136 is directly opposite the inner face of a protruding step such as 146a on pole piece 146. These opposed steps constitute pairs of opposite magnetic poles and are disposed at equal intervals circumferentially of the gyro wheel spin axis; there are an even number of these pole pieces, so that for each pole pair there is a corresponding pole pair on the opposite side of the spin axis. A convenient number of pole pairs is ten, although other numbers may be used. The length of each pole circumferentially is preferably slightly smaller than the circumferential pole separaton, so that the effective circumferential pole length and the effective circumferential pole separations are equal; this difference between actual and effective circumferential pole length is due to a magnetic fringing effect which makes the pole effectively longer than it actually is. The annular array of pole pairs produces regions between the tips of the poles of each pair in which the magnetic field is locally enhanced, as will be apparent from the following discussions.

Figure 6:
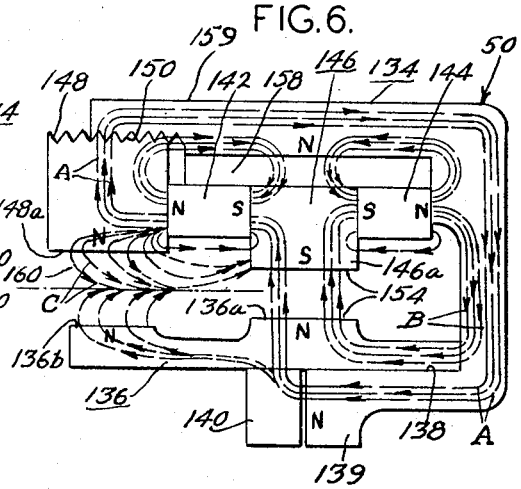
FIGURE 6 is a fragmentary view similar to those represented in FIGURES 4 and 5 but without the coil support and coils, and showing certain magnetic flux paths existing in the device.

Referring now to FIGURE 6, it will be seen that the construction described results in a relatively intense magnetic flux in each gap 154 between each pair of confronting poles such as 136a and 146a. The lines with arrowheads in FIGURE 6 represent the magnetic lines of flux. In the example shown in FIGURE 6 it is assumed that the south pole of ring magnets 142 and 144 are disposed adjacent opposite sides of pole pieces 146 so that each of the poles 146a is essentially a south pole and each of the poles 136a is essentially a north pole. The magnetic flux from magnet 142 is principally along the flux lines A, i.e. from the north pole of magnet ring 142 through locking nut 148, shield member 134, pole 136a, air gap 154, pole 146a, pole piece 146 and thence back to the south pole of ring magnet 142. Similarly, the main path of magnetic flux from ring magnet 144 is along the flux lines B, i.e. from the north pole of magnet 144 through shield member 134, pole 136a, air gap 154, pole 146a, pole piece 146, and back to the south pole of magnet 144. It will be seen that both ring magnets 142 and 144 therefore contribute to the production in air gap 154 of a locally-intense magnetic field in which the flux lines are directed radially outward from the spin axis of the gyro wheel. A similar situation exists with respect to each of the pairs of opposed poles around the circumference of the annular air gap 154 inside shield member 134. The annular opening 158 between the ring magnets and the radially-outermost portion 159 of shield member 134 prevents shortcircuiting of the ring magnets.

The annular cavity in wheel 50 has an annular opening 160 extending to the exterior on one side of the wheel 50 to permit the coil support cylinder 124 to extend into the interior of the slot. This opening introduces a gap in the shielding of the magnetic field by the gyro wheel, through which small amount of magnetic flux may radiate from the interior of the wheel to the external stationary parts of the gyro assembly. This is due to fringing of some of the flux from ring magnets 142 and 144 which returns to magnet 142 by way of opening 160, as indicated by the flux lines C. However, the amount of flux which traverses the opening 160 is small compared with that flowing through the air gap 154 between the opposed poles. The flux in the opening 160 also tends to exhibit a minimal amount of fringing since the lower portion 148a of locking nut 148 and the upper portion 136b of the cylindrical member 136 which define the opposite sides of opening 160 are both effectively north poles. Furthermore, the magnetic flux which escapes through the opening 160 can be made even smaller, if desired, by extending the axial lengths of the locking nut portion 148a and the portion 136b of the cylindrical member as will be described later herein.

Figure 4:
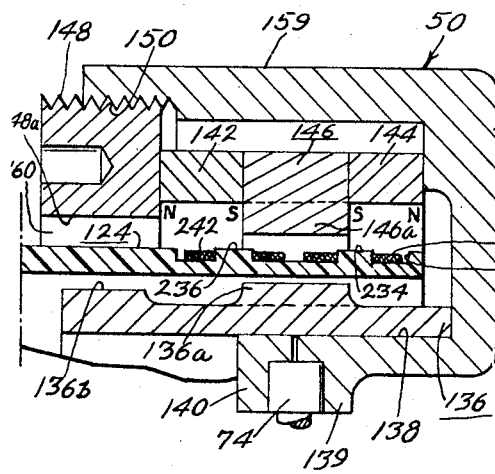
FIGURE 4 is a fragmentary sectional view of a portion of the apparatus shown in FIGURE 3, taken along line 4—4.

FIGURE 4 illustrates how each pair of pickoff coils such as 240, 242 on coil support 124 is preferably positioned axially of the gyro wheel 50 when the gyro wheel is in its null or reference position i.e. when its spin axis lies along the axis of shaft 54.

Figure 5:
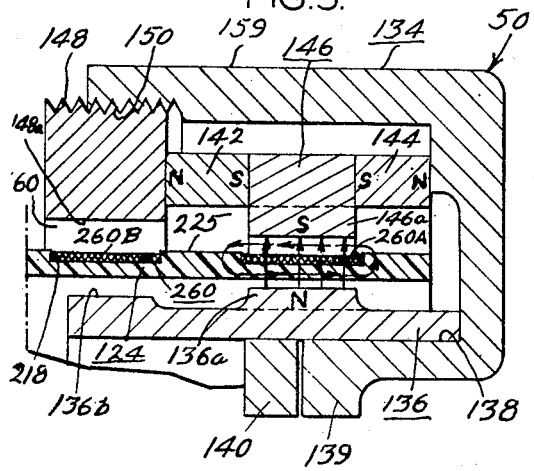
FIGURE 5 is a fragmentary sectional view of a portion of the apparatus shown in FIGURE 3 taken along line 5—5.

FIGURE 5 illustrates the axial position of the torquer coils such as 260. The detailed arrangment of the pickoff and torquer coils is shown in FIGURE 7. As can be seen, the pickoff coils are "pancake" coils disposed in coplanar relation to each other axially and curved slightly circumferentially to lie flat against the cylindrical surface of coil support 124. The coils of each pair are displaced from each other slightly along the nominal spin axis, adjacent sides of the two coils lying within the gap 154 and being equally spaced on either side of the center line of the gap.

As is shown particularly clearly in FIGURE 7, in this example the coil support 124 is provided with four smaller depressions 210, 212, 214, 216 equally spaced along the circumference of support 124, and with four larger depressions 218, 220, 222, 224 each located between different successive pairs of smaller depressions. Each depression is cut into the outer surface of coil support 124. Central uncut portions 225, 226, 228, 230 of rectangular form are left at the center of larger depressions 210, 212, 214, 216, respectively. A pair of axially-spaced rectangular uncut portions 234, 236 are left in smaller depression 210, and similar uncut portions of depressions 212, 214 and 216. A pair of rectangular pickoff coils 240 and 242 having rectangular central apertures fit around the raised, uncut portions 234 and 236 and within the depression 210, and are wound concentric with the uncut portions. Similar pairs of pickoff coils 246, 248 and 250, 252 and 254, 256 are provided in similar fashion in depressions 212, 214 and 216. The larger depressed regions 218, 220, 222 and 224 contain, respectively, rectangular, centrally-apertured torquer coils 260, 262, 264 and 266, each of which fits around its corresponding raised, uncut portion of support 124, and is wound concentric therewith. Two leads from the opposite ends of pickoff coil 240 are brought separately to terminals 270 and 272, two leads from the opposite ends of pickoff coils 242 are brought out separately to terminals 272 and 274, and a pair of leads from torquer coil 260 are brought out separately to terminals 276 and 278, to which terminals the leads are connected. The other pickoff and torquer coils are similarly connected to corresponding sets of terminals.

In FIGURE 7 the line P–P' represents the locus of the centers of the pole pieces such as 146a, 136a when the gyro wheel spins in its null or reference position. The dotted rectangles such as 280 represent the circumferential positions of the pole pieces such as 146a at a given instant of time, again when the gyro wheel is in its reference position. It will be seen that the center line P–P' passes between each of the pickoff coils such as 240, 242 and equidistant from their adjacent sides, and that it also passes directly along the center lines of the upper sides such as 260A of the torquer coils. Accordingly, as the gyro wheel 50 rotates the pickoff coils are subjected to a regularly-varying magnetic field due to the passage thereby the pole pieces, and a pulsating voltage is induced in the sides of the pickoff coils which are cut by the moving magnetic field, i.e. the sides 240A, 240B of pickoff coil 240 and the sides 242A and 242B of pickoff coil 242. For maximum induced voltage in the pickoff coils, the circumferential length of each pickoff coil between the centers of its opposite sides along the line P–P' should be equal to the width of one effective pole, so that the leading edge of the pole will be over one side of the pickoff coil when the trailing edge of the pole is over the other side of the pickoff coil. For the condition shown in FIGURE 7 in which the gyro wheel is in its null position, equal voltages will be induced in the two pickoff coils of each pair. Since the width of the pole pieces along the direction of the spin axis, i.e. perpendicular to the line P–P' in FIGURE 7, is less than would be required to cover the combined width of the pickoff coils of each pair, angular deviation of the gyro wheel from its null position upward in FIGURE 7 will induce a stronger voltage in the upper pickoff coil 240 and a weaker voltage in coil 242, and vice versa for the opposite direction of wheel deviation.

In FIGURE 8 the coils shown schematically therein are numbered to correspond with the corresponding coils of FIGURE 7, as are the coil terminals. As shown in FIGURE 8, the pickoff coils are connected in voltage-opposing series relation so that when the voltages induced therein by the passing pole pieces are equal in magnitude there is zero output between terminals 270 and 274; accordingly the voltage between terminals 270 and 274 is zero when the gyro wheel is in its null position, positive for one angular direction of deviation and negative for the opposite direction of deviation. Furthermore, the terminals 270 and 274 are connected in voltage-opposing series relationship with the corresponding terminals 281 and 284 of the pair of pickoff coils 250, 252 which are mounted on the diametrically opposite side of the gyro wheel. The pickoff voltage output between terminals 288 and 290 is therefore the difference between the net voltage from pickoff coils 240, 242 and the net voltage from pickoff coils 250, 252. In this way any output signal of the individual pairs of pickoff coils due to linear translation is canceled out at terminals 288, 290 and only angular deviations of the gyro wheel are effective to produce output signals at terminals 288, 290. The pickoff coils 246, 248 and 254, 256 are similarly connected to each other so as to produce between pickoff output terminals 292 and 294 signals indicative of angular deviation of the gyro wheel 50 about an axis normal to the axis with respect to which the pickoff coils 240, 242, 250, 252 sense deviations. For the above-described canceling effects to take place, the position of any pair of poles with respect to any given pair of pickoff coils should be the same as the position of another pair of poles with respect to the diametrically-opposite pair of pickoff coils, and for this reason an even number of pole pairs should be used.

Referring now particularly to FIGURES 5 and 7 for a description of the operation with respect to the torquing of the gyro wheel, it is first noted that only one side of each torquing coil, such as side 260A of coil 260 is traversed longitudinally by the poles 146a and 136a, the opposite side 260B of the torquer coil 260 lying within the opening 160. When coil 260 is energized with a direct current, the magnetic field thereby produced around the coil side 260A reacts with the magnetic field due to magnet rings 142 and 144 acting through poles 146a and 136a to aply to the gyro wheel 50 a torque proportional to the current in the torquer coil. Referring especially to FIGURE 5 in which the lines with arrowheads represent directions of magnetic flux, assuming again that the direction of magnetic flux in the gap 154 is directed radially outwardly from the axis of the gyro wheel, if the current through coil side 260A is in the direction to produce a counterclockwise magnetic field as shown in FIGURE 5, this field will add to the field due to the magnet rings at the right-hand side of coil side 260A and subtract therefrom at the left-hand side of coil side 260A. Since the coil is fixed, the resultant strengthened magnetic field at the right of coil side 260A tends to displace the gyro wheel to the right in FIGURE 5, i.e. to apply a torque to it is in clockwise direction.

Referring now to FIGURE 7, in the preferred embodiment the active length of each side of the torquer coils which is responsive to torquing current to apply a torque to the gyro wheel, such as 260A, preferably is substantially equal to the distance between successive effective pole pieces. With this arrangement, the portions or legs such as 260D, 260C of the torquer coils which include windings extending transversely to the direction of pole motion which are traversed by the poles, are so traversed simultaneously by two successive poles in the same way, so that equal and opposite pulses are induced in the torquer coil by the rotating poles. Accordingly, the currents induced in the torquer coils by the poles cancel each other out, and have no effect on the applied torquer current. If it were not for this arrangement, when the gyro wheel deviated from its normal position progressively further there would be a progressively greater induced current in the torquer coils, which would change the total torquer coil current, and hence the torque applied to the gyro wheel for a given torquer current would be different depending upon the angular position of the wheel, a condition which is generally undesirable.

The same relations and considerations described for torquer coil 260 obtain for the other torquer coils 262, 264, 266. Torquer coils 260 and 264 are supplied in series with torquing current from terminals 295, 296, the polarity of connection being such that the torques thereby applied to the gyro wheel are aiding. Torquing about the other orthogonal axis is provided in a similar manner by torquer coils 262, 266 which are supplied with torquing current from terminals 298, 299.

It is noted that the outer portion of the rim region of the gyro wheel is all at the same "magnetic potential," that is, as shown in FIGURE 6 for example, it is all at a "north pole" magnetic potential. Stepped pole piece 146 is all at a "south pole" magnetic potential, and substantially all of the magnetic flux is thereby confined to the gyro wheel.

However, referring again to FIGURE 6 it will be evident that the opening 160 introduces a gap in the shielding provided for the magnetic field, through which a small portion of the magnetic flux may escape to the stationary parts of the gyro. This is attributable to two principal causes: first, the flux across the main gap 154 exhibits a certain degree of fringing which may penetrate to some extent through opening 160, and secondly, since the magnetic materials used do have some small reluctance, some magnetic potential does exist across the opening 160 and the resulting flux has some tendency to exhibit fringing through the opening to the exterior. The first effect can be substantially completely nullified by extending the axial length of the opening 160, so that the gap serves as an effective cut-off waveguide, providing very high attenuation for magnetic flux generated by the poles 136a and 146a. The second effect can be minimized by appropriate magnetic design of the composite gyro wheel.

There may also be a small amount of magnetic flux extending from the shield 134 of FIGURE 2 to the surrounding cylindrical housing 300. When the gyro wheel is rotated at or near its null position, the wheel and the housing are concentric, so that any such leakage flux between wheel and housing produces forces on the wheel which are radial and symmetrical about the spin axis. These radial forces cancel, and produce no net torque on the gyro, except such minor torques as may be due to mechanical or magnetic imperfections or to lack of symmetry in the wheel structure and housing. When the wheel deviates from its null position, however, the symmetry is upset and a net torque of a small amount is exerted on the gyro wheel. This torque is comparable to a spring restraint with a low spring constant, and can be compensated in the tuned type of gyro described in the above-cited copending application by suitable adjustment of the rotational speed of the wheel. In any event, any such minor remaining torques can be minimized by increasing the air gap between the wheel 50 and the housing 300, provided that a larger size of housing can be tolerated in the particular application.

The housing 300, being of magnetic material. is part of a substantially continuous magnetic shield around gyro wheel 50 which includes also the frame 100 and the shield 126.

Figure 9:
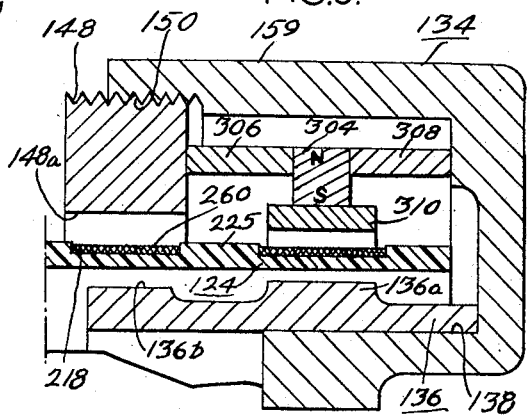
FIGURE 9 is a fragmentary sectional view illustrating one alternative form for the construction shown in FIGURE 5.

While the embodiment of the invention illustrated in FIGURES 4, 5 and 6, wherein the radial magnetic flux is produced by a pair of axially-magnetized rings butting against opposite sides of a circular pole piece, represents the preferred form of the invention from a practical standpoint, it is also possible to utilize a radially-magnetized ring such as 304 as shown in FIGURE 9, located between a pair of abutting rings 306 and 308 which are not magnets but are of magnetic material such as steel. In this arrangement an annular pole piece 310 of magnetic material is used, which is provided with the same type of regularly-spaced steps as are present on pole piece 146 of the embodiment previously described. However, the construction shown in FIGURE 9 is not as efficient as that previously described and it is generally more difficult to produce commercially high-quality magnet rings which are radially magnetized than it is to produce high-quality magnet rings which are axially magnetized; in this respect also the previously described embodiment is preferable.

It will be understood that while a pair of magnet rings are utilized in the preferred embodiment, it is possible to replace one of the magnet rings with a ring of non-magnetic material and rely upon the single magnet ring to produce the necessary magnetic flux. However such arrangements would produce undesirable dissymmetry and will be less efficient in producing magnetic flux across the gap 154.

While the invention has been described with particular reference to specific embodiments thereof in the interest of complete definiteness, it will be understood that it may be embodied in a variety of other diverse forms differing substantially from those specifically shown and described without departing from the scope and spirit of the invention as defined by the appended claims.

We claim:
1. Gyroscope apparatus comprising:
   a frame;
   a gyro wheel mounted on said frame for rotation about a spin axis in said frame, and capable of angular deviation of its spin axis from a reference direction, said wheel having a cavity therein extending circumferentially completely around said spin axis;

coil means in said cavity supported independently of said wheel; and magnet means inside and secured to said wheel for magnetically linking said wheel and said coil means; at least a portion of said wheel comprising a shield of magnetic material interposed between said cavity and said frame for reducing magnetic coupling between said wheel and said frame.

2. Apparatus in accordance with claim 1, in which said wheel has a generally annular opening therein extending around said spin axis and providing communication between said cavity and the exterior of said wheel, said apparatus comprising generally-cylindrical coil support means mounted on said frame and extending through said opening into said cavity for supporting said coil means.

3. Apparatus in accordance with claim 2, in which the walls of said opening are extended along the direction of said spin axis sufficiently to attenuate greatly magnetic flux generated in said cavity and fringing through said opening to the exterior of said wheel.

4. Apparatus in accordance with claim 1, in which said magnet means comprises a generally annular permanent magnet extending around said spin axis for providing a homopolar magnetic field across a generally annular gap in said wheel.

5. Apparatus in accordance with claim 1, in which substantially all portions of said wheel which defined said cavity are of magnetic material.

6. Apparatus in accordance with claim 5, in which said frame comprises a cylindrical housing around said wheel and coaxial with said wheel when the plane of rotation of said wheel is in a reference position.

7. Apparatus in accordance with claim 1, comprising magnetic shield means supported on said frame and substantially completely enclosing the portion of said wheel containing said magnet means.

8. Apparatus in accordance with claim 1, in which said wheel comprises magnetic circuit means cooperating with said magnet means to form a plurality of pairs of opposed magnetic poles, the poles of each of said pairs being disposed on opposite sides of an annular gap in said cavity extending around said spin axis, said pairs being spaced from each other along said gap, said coil means being disposed at least partially within said gap, whereby rotation of said wheel causes said pairs of poles to induce electrical pulses in said coil means of a strength depending upon the angle of the plane of rotation of said wheel.

9. Apparatus in accordance with claim 8, in which said coil means comprise at least a pair of pickoff coils displaced from each other axially of said wheel, whereby angular deviations of the plane of rotation of said wheel change the relative strengths of said pulses in said two coils.

10. Apparatus in accordance with claim 9, in which said coil means comprise two pairs of said pickoff coils, said two pairs being disposed opposite each other with respect to said spin axis.

11. Apparatus in accordance with claim 1, in which said magnet means comprises an annular permanent magnet coaxial with said spin axis, said wheel providing a closed magnetic circuit for said magnet except for an annular gap coaxial with said spin axis, said coil means being disposed at least partially in said gap.

12. Apparatus in accordance with claim 1, in which said permanent magnet is axially magnetized.

13. Apparatus in accordance with claim 12, comprising another axially magnetized annular permanent magnet coaxial with said spin axis and axially displaced from said first-named permanent magnet, an annular pole piece coaxial with said spin axis and secured in said wheel between said permanent magnets with like poles of said magnets abutting axially opposite sides of said pole piece, said magnets and said pole piece being disposed within said cavity, the poles of said magnets opposite those abutting said pole piece being in contact with axially opposite walls of said cavity.

14. Apparatus in accordance with claim 1, in which said coil means comprise torquer coil means responsive to electrical current therethrough to exert a torque on said wheel about an axis normal to said spin axis.

15. Apparatus in accordance with claim 14, in which said torquer coil means comprises windings extending substantially along the circumference of a circle in said wheel coaxial with said spin axis, said magnet means producing a magnetic field at said windings directed substantially normal to the direction of said windings.

16. Apparatus in accordance with claim 1, in which said coil means comprise pickoff coils responsive to rotation of said wheel to produce signals indicative of angular deviation of said wheel from a reference position thereof, about an axis normal to said spin axis.

17. Apparatus in accordance with claim 1, in which said coil means comprise pickoff coil means and torquer coil means alternating with each other circumferentially around said spin axis.

18. Gyroscope apparatus comprising:
a frame,
a gyro wheel mounted on said frame for rotation about a spin axis therein, said wheel having an annular cavity therein and an annular opening from said cavity to the exterior in one side face thereof;
an annular permanent magnet in and secured to said wheel, said wheel having an annular portion of magnetic material substantially completely enclosing said magnet except for said opening and cooperating with said magnet to produce a homopolar magnetic field across an annular gap in said wheel coaxial with said spin axis, said field having a space-variant strength along said gap;
coil support means mounted on said frame and extending through said opening into said gap; and
pickoff coil means and torquer coil means mounted on said coil support means and disposed at least partially in said gap.

19. Apparatus in accordance with claim 18, comprising magnetic shield means of magnetic material secured to said frame and substantially completely enclosing and separating the portion of said wheel containing said magnet from the exterior of said gyroscope apparatus.

20. Apparatus in accordance with claim 19, in which said pickoff coil means comprises two pairs of coils, said pairs being diametrically opposed to each other with respect to said wheel, each coil of each of said pairs being adjacent but axially displaced from the other coil of said each pair, adjacent sides of the coils of each of said pairs lying within said gap, said coil means also comprising two torquer coils alternating with said two pairs of pickoff coils around the circumference of said coil support means, each of said torquer coils having one side thereof in said gap.

References Cited

UNITED STATES PATENTS

| | | | |
|---|---|---|---|
| 2,850,905 | 9/1958 | Sedgfield | 74—5.7 |
| 2,948,813 | 8/1960 | Osborne | 250—203 |
| 2,960,873 | 11/1960 | Lundberg | 74—5 |
| 3,188,540 | 6/1965 | Lautzenhiser | 318—23 |
| 3,252,340 | 5/1966 | Watt | 74—5.46 |
| 3,283,594 | 11/1966 | Parker et al. | 74—5.46 |
| 3,327,541 | 6/1967 | Clark et al. | 74—5.46 |

C. J. HUSAR, *Primary Examiner.*